(12) United States Patent
Chapman et al.

(10) Patent No.: US 9,062,505 B2
(45) Date of Patent: Jun. 23, 2015

(54) METHOD FOR LASER CUTTING POLYCRYSTALLINE DIAMOND STRUCTURES

(75) Inventors: Mark P. Chapman, Provo, UT (US); Ronald W. Ward, Pleasant Grove, UT (US); Nicholas Christensen, Spanish Fork, UT (US); Damon B. Crockett, Mapleton, UT (US)

(73) Assignee: US SYNTHETIC CORPORATION, Orem, UT (US)

( * ) Notice: Subject to any disclaimer, the term of this patent is extended or adjusted under 35 U.S.C. 154(b) by 537 days.

(21) Appl. No.: 13/166,007

(22) Filed: Jun. 22, 2011

(65) Prior Publication Data
US 2014/0366456 A1  Dec. 18, 2014

(51) Int. Cl.
*E21B 10/46* (2006.01)
*E21B 10/567* (2006.01)

(52) U.S. Cl.
CPC .............. *E21B 10/46* (2013.01); *E21B 10/567* (2013.01)

(58) Field of Classification Search
CPC ............................... E21B 10/46; E21B 10/567
USPC ................... 175/327–435; 423/466
See application file for complete search history.

(56) References Cited

U.S. PATENT DOCUMENTS

| 4,268,276 A | 5/1981 | Bovenkerk |
| 4,322,390 A | 3/1982 | Tolley et al. |
| T102,901 I4 | 4/1983 | Offenbacher |
| 4,410,054 A | 10/1983 | Nagel et al. |
| 4,468,138 A | 8/1984 | Nagel |
| 4,560,014 A | 12/1985 | Geczy |
| 4,629,373 A * | 12/1986 | Hall .............................. 407/118 |
| 4,738,322 A | 4/1988 | Hall et al. |
| 4,789,251 A | 12/1988 | McPherson et al. |
| 4,811,801 A | 3/1989 | Salesky et al. |
| 4,913,247 A | 4/1990 | Jones |
| 4,951,762 A | 8/1990 | Lundell |
| 4,984,642 A * | 1/1991 | Renard et al. ................. 175/430 |
| 4,993,505 A | 2/1991 | Packer et al. |

(Continued)

FOREIGN PATENT DOCUMENTS

| EP | 0543461 | 5/1993 |
| JP | H06-170571 | * 6/1994 ............ B23K 26/00 |

OTHER PUBLICATIONS

Pilkey, Formulas for Stress, Strain, and Structural Matrices, 2005, John Wiley & Sons, 2nd edition, p. 264.*

(Continued)

*Primary Examiner* — Pegah Parvini
(74) *Attorney, Agent, or Firm* — Dorsey & Whitney LLP

(57) ABSTRACT

Methods of laser cutting polycrystalline diamond tables and polycrystalline diamond compacts are disclosed. Laser cutting of the polycrystalline diamond table provides an alternative to electrical-discharge machining ("EDM"), grinding with a diamond wheel, or lapping with a diamond wheel. Grinding or lapping with a diamond wheel is relatively slow and expensive, as diamond is used to remove a diamond material. EDM cutting of the polycrystalline diamond table is sometimes impractical or even impossible, particularly when the cobalt or other infiltrant or catalyst concentration within the polycrystalline diamond table is very low (e.g., in the case of a leached polycrystalline diamond table). As such, laser cutting provides a valuable alternative machining method that may be employed in various processes such as laser scribing, laser ablation, and laser lapping.

26 Claims, 14 Drawing Sheets

(56) References Cited

U.S. PATENT DOCUMENTS

| | | | |
|---|---|---|---|
| 5,016,718 | A | 5/1991 | Tandberg |
| 5,054,246 | A | 10/1991 | Phaal et al. |
| 5,092,687 | A | 3/1992 | Hall |
| 5,120,327 | A | 6/1992 | Dennis |
| 5,135,061 | A | 8/1992 | Newton, Jr. |
| 5,154,245 | A | 10/1992 | Waldenstrom et al. |
| 5,180,022 | A | 1/1993 | Brady |
| 5,267,398 | A | 12/1993 | Hall |
| 5,342,129 | A | 8/1994 | Dennis et al. |
| 5,364,192 | A | 11/1994 | Damm et al. |
| 5,368,398 | A | 11/1994 | Damm et al. |
| 5,460,233 | A | 10/1995 | Meany et al. |
| 5,480,233 | A | 1/1996 | Cunningham |
| 5,512,235 | A * | 4/1996 | Cerutti et al. .................. 419/10 |
| 5,544,713 | A | 8/1996 | Dennis |
| 5,558,170 | A | 9/1996 | Thigpen et al. |
| 5,667,028 | A | 9/1997 | Truax et al. |
| 5,979,578 | A | 11/1999 | Packer |
| 6,135,219 | A | 10/2000 | Scott |
| 6,145,608 | A * | 11/2000 | Lund et al. .................. 175/428 |
| 6,190,096 | B1 | 2/2001 | Arthur |
| 6,258,139 | B1 * | 7/2001 | Jensen ........................ 51/307 |
| 6,272,753 | B2 | 8/2001 | Packer |
| 6,419,034 | B1 | 7/2002 | Belnap et al. |
| 6,460,637 | B1 | 10/2002 | Siracki et al. |
| 6,793,681 | B1 | 9/2004 | Pope et al. |
| 7,108,598 | B1 | 9/2006 | Galloway |
| 7,152,701 | B2 | 12/2006 | Butland et al. |
| 7,316,279 | B2 | 1/2008 | Wiseman et al. |
| 7,552,782 | B1 | 6/2009 | Sexton et al. |
| 7,553,740 | B2 | 6/2009 | Sharp et al. |
| 7,559,695 | B2 | 7/2009 | Sexton et al. |
| 7,585,342 | B2 | 9/2009 | Cho |
| 7,608,333 | B2 | 10/2009 | Eyre |
| 7,670,406 | B2 | 3/2010 | Belashchenko |
| 7,703,982 | B2 | 4/2010 | Cooley |
| 7,866,418 | B2 | 1/2011 | Bertagnolli et al. |
| 7,870,913 | B1 | 1/2011 | Sexton et al. |
| 7,896,551 | B2 | 3/2011 | Cooley et al. |
| 7,901,137 | B1 | 3/2011 | Peterson |
| 7,946,768 | B2 | 5/2011 | Cooley et al. |
| 7,998,573 | B2 | 8/2011 | Qian et al. |
| 8,020,471 | B2 | 9/2011 | Hall et al. |
| 8,034,136 | B2 | 10/2011 | Sani |
| 8,147,142 | B1 | 4/2012 | Peterson |
| 8,157,029 | B2 | 4/2012 | Zhang et al. |
| 8,383,984 | B2 * | 2/2013 | Osako et al. ............. 219/121.72 |
| 8,393,419 | B1 | 3/2013 | Burton |
| 8,534,391 | B2 | 9/2013 | Wirth |
| 2004/0007394 | A1 | 1/2004 | Griffin |
| 2004/0190804 | A1 | 9/2004 | John et al. |
| 2005/0133277 | A1 | 6/2005 | Dixon |
| 2007/0034147 | A1 * | 2/2007 | Wort et al. .................... 117/929 |
| 2007/0046119 | A1 | 3/2007 | Cooley |
| 2007/0187155 | A1 | 8/2007 | Middlemiss |
| 2009/0114628 | A1 * | 5/2009 | DiGiovanni ............. 219/121.72 |
| 2009/0242525 | A1 * | 10/2009 | O'Brien et al. .......... 219/121.68 |
| 2009/0260877 | A1 | 10/2009 | Wirth |
| 2010/0218995 | A1 | 9/2010 | Sexton et al. |
| 2010/0226759 | A1 | 9/2010 | Cooley et al. |
| 2010/0270088 | A1 | 10/2010 | Zhang et al. |
| 2010/0314176 | A1 | 12/2010 | Zhang et al. |
| 2011/0017520 | A1 * | 1/2011 | Webb ........................... 175/428 |
| 2011/0031036 | A1 | 2/2011 | Patel |
| 2011/0073379 | A1 | 3/2011 | DiGiovanni et al. |
| 2011/0174544 | A1 | 7/2011 | Scott et al. |
| 2012/0048626 | A1 | 3/2012 | Bellin |
| 2012/0175652 | A1 * | 7/2012 | Chyr et al. ...................... 257/98 |
| 2012/0281938 | A1 | 11/2012 | Peterson et al. |

OTHER PUBLICATIONS

Howes, The Graphitization oF Diamond, 1962, Proc. Phys. Soc., vol. 80, pp. 648-662.*
U.S. Appl. No. 12/558,939, filed Sep. 14, 2009, Miess et al.
Davis, J.R. Editor, "Corrosion Behavior of Nickel and Nickel Alloys", Nickel, Cobalt, and Their Alloys, ASM Specialty Handbook, Jan. 1, 2000, pp. 157.
Davis, J.R., Editor, "Failures from Various Mechanisms and Related Environmental Factors", Metals Handbook Desk Edition, Second Edition (ASM International), published Dec. 1998, pp. 1231-1232.
Smith International, Geodiamond, "Quick Cutter", available as of Nov. 9, 2010, (3 pages).
U.S. Appl. No. 13/116,566, Aug. 1, 2013, Office Action.
U.S. Appl. No. 11/545,929, filed Oct. 10, 2006, Bertagnolli.
U.S. Appl. No. 12/961,787, filed Dec. 7, 2010, Mukhopadhyay, et al.
U.S. Appl. No. 13/116,566, filed May 26, 2011, Miess.
U.S. Appl. No. 13/234,252, filed Sep. 16, 2011, Gonzalez, et al.
Joseph, B., et al.—Liquid metal embrittlement: A state-of-the-art appraisal—The European Physical Journal Applied Physics, 1999.
Tze-Pin Lin, Michael Hood, George A. Cooper, and Redd H. Smith, Residual Stresses in Polycrystalline Diamond Compacts, J. Am. Ceram. Soc. 77[6] pp. 1562-1568 (1994).
U.S. Appl. No. 13/432,224, filed Mar. 28, 2012, Peterson et al.
U.S. Appl. No. 13/116,566, Mar. 26, 2014, Office Action.
U.S. Appl. No. 13/234,252, Jan. 28, 2014, Office Action.
U.S. Appl. No. 13/116,566, Oct. 2, 2013, Office Action.
U.S. Appl. No. 13/234,252, Oct. 4, 2013, Office Action.
U.S. Appl. No. 13/234,252, May 5, 2014, Notice of Allowance.
U.S. Appl. No. 14/452,206, filed Aug. 5, 2014, Gonzalez, et al.
U.S. Appl. No. 14/481,592, filed Sep. 9, 2014, Miess.
International Search Report and Written Opinion from International Application No. PCT/US2013/033324 mailed Aug. 30, 2013.
U.S. Appl. No. 13/116,566, Oct. 1, 2014, Issue Notification.
U.S. Appl. No. 13/234,252, Aug. 20, 2014, Issue Notification.
U.S. Appl. No. 13/234,252, Sep. 23, 2014, Notice of Allowance.
U.S. Appl. No. 13/432,224, Jul. 3, 2014, Office Action.
U.S. Appl. No. 13/432,224, Sep. 10, 2014, Office Action.
U.S. Appl. No. 13/116,566, Jun. 9, 2014, Notice of Allowance.
U.S. Appl. No. 13/432,224, mailed Apr. 7, 2015, Office Action.

* cited by examiner

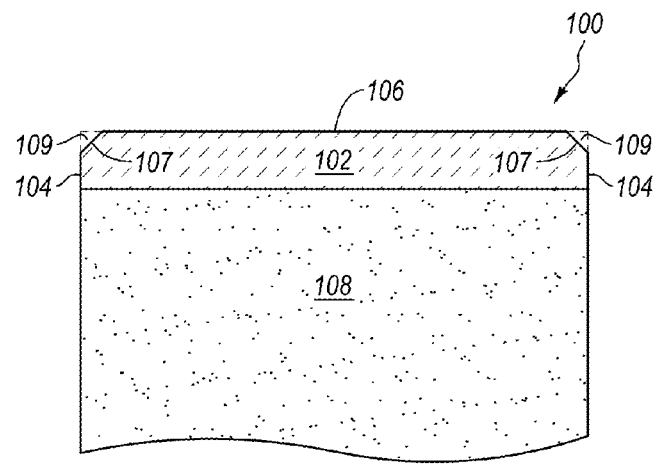
Fig. 6
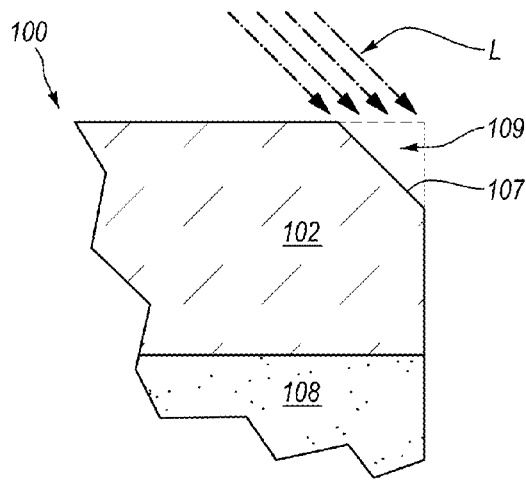 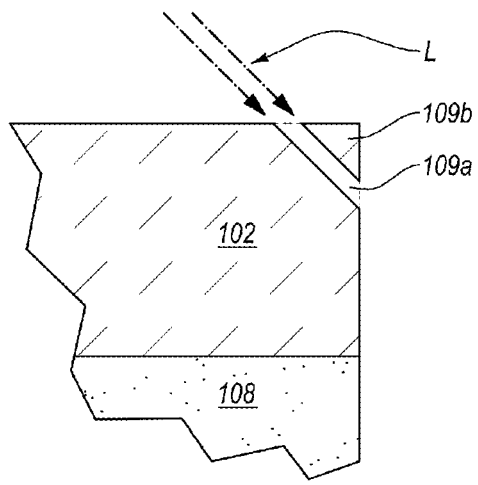
Fig. 6A          Fig. 6B
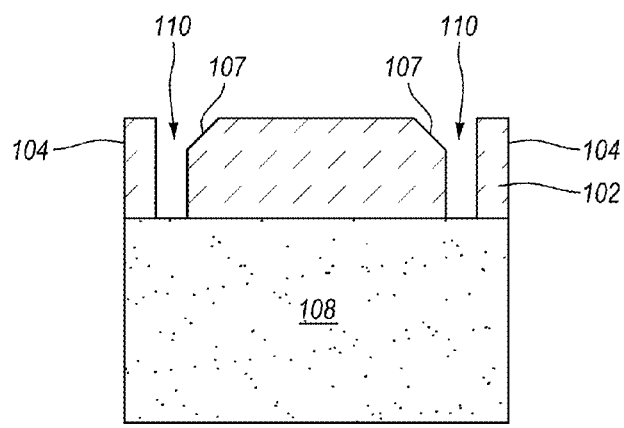
Fig. 6C

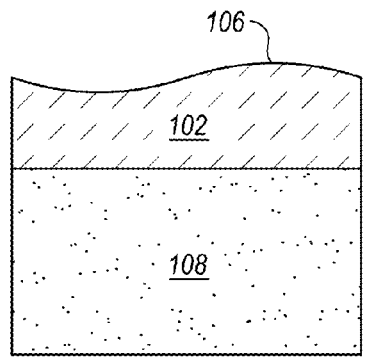 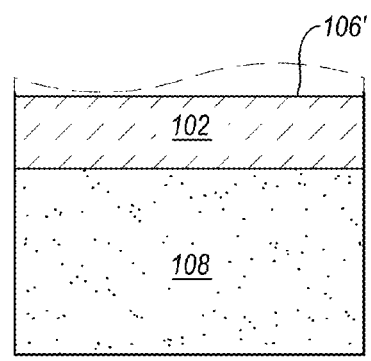
Fig. 8A   Fig. 8B
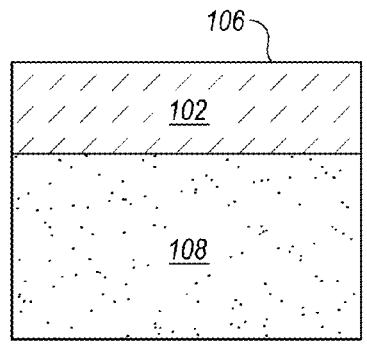 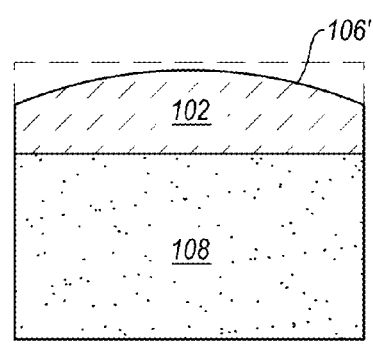
Fig. 9A   Fig. 9B
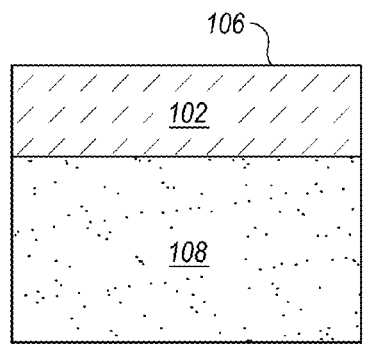 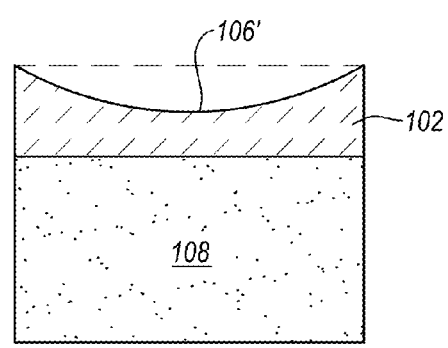
Fig. 10A   Fig. 10B

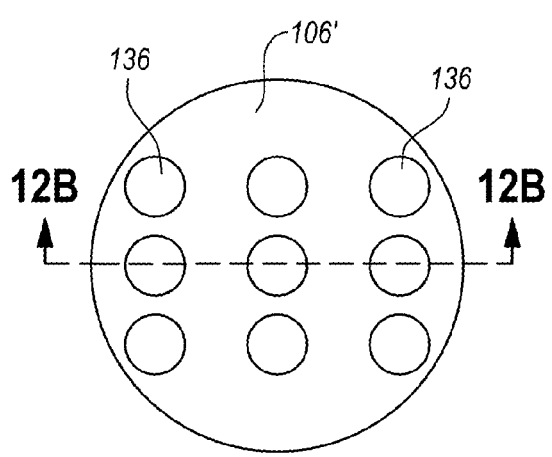 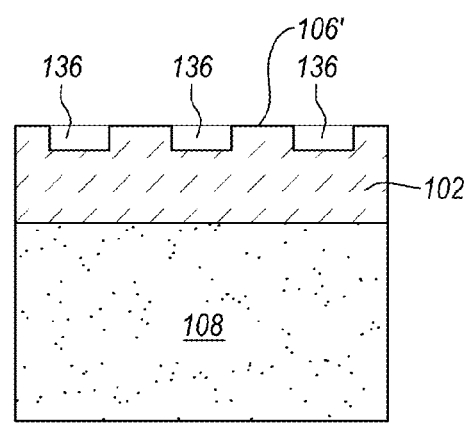
*Fig. 12A*     *Fig. 12B*
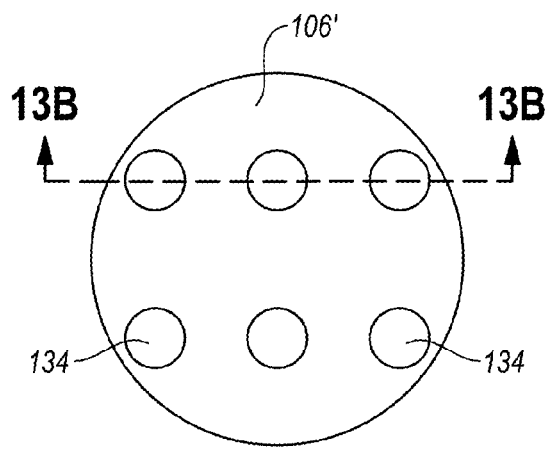 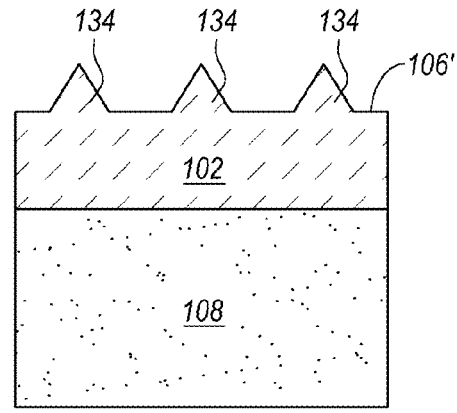
*Fig. 13A*     *Fig. 13B*

METHOD FOR LASER CUTTING POLYCRYSTALLINE DIAMOND STRUCTURES

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container or cartridge with a volume of diamond particles positioned on a surface of the cemented carbide substrate. A number of such cartridges may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of a matrix of bonded diamond grains having diamond-to-diamond bonding therebetween, with interstitial regions between the bonded diamond grains being occupied by the solvent catalyst. Once the PCD table is formed, the solvent catalyst may be at least partially removed from the PCD table of the PDC by acid leaching.

It is often desirable to machine the PCD table, for example by forming a chamfer into the PCD table or to cut the PDC to provide a non-cylindrical shape. Such cutting has typically been accomplished by electrical-discharge machining, grinding, lapping or combinations thereof to remove desired portions of the PCD table and substrate. Despite the availability of such methods, manufacturers and users of PDCs continue to seek improved PDC manufacturing methods.

SUMMARY

Embodiments of the invention relate to methods of laser cutting PCD structures, such as PCD tables and PDCs. In many of the disclosed embodiments, a PCD table is provided. Such a PCD table may be separate from or bonded to a substrate as part of a PDC. In an embodiment of a method of shaping a PCD, laser energy is applied to an exterior surface of the PCD table to remove diamond material adjacent to the exterior surface so as to form a generally V-shaped groove into the PCD table. The V-shaped groove may comprise a scribe line or curve along which the PCD table may then be broken. Such laser scribing may be used to form a non-cylindrical PCD table or PDC from a cylindrical PCD table or PDC, for example, by electrical-discharge machining ("EDM") wire cutting or otherwise cutting (e.g., grinding) through the remainder of the diamond and/or substrate material generally along the scribe line or groove to form a non-cylindrical PCD table having an oval, square, rectangular, or other shaped profile. In another embodiment, the PCD or PDC may be broken generally along the scribe line. Although it is possible to form non-cylindrical PCD tables and PDCs through HPHT processes, such processes are more complex and expensive, often requiring additional steps to ensure the integrity of the non-cylindrical diamond table or PDC. Of course, in other embodiments, a generally cylindrical PCD table may also be formed by such a process (e.g., by removing a peripheral edge of an initial larger PCD table).

In some embodiments, laser energy is applied to an exterior surface of a provided PCD table in a series of passes of the laser so that the diamond material is removed to a first depth in a first pass and at least one subsequent pass thereafter removes diamond material adjacent to and at a depth greater than the diamond material removed in the immediately previous pass of the laser. Such progressive formation of the laser cut in the PCD table prevents or minimizes any thermal damage to the PCD table as the depth of material removed in each pass is sufficiently low so as to substantially prevent overheating or damage to adjacent diamond material. For example, such progressive cutting can prevent or minimize back conversion of diamond to graphite or amorphous carbon that may otherwise result where heat from the laser cutting is absorbed too rapidly into adjacent diamond material. Multiple passes, particularly when separated by rest periods, allow the heat to better dissipate, resulting in an overall lower temperature rise within the material adjacent to that being laser cut. Although such methods may allow for very high quality while minimizing damage, in alternative embodiments, the diamond material may be cut to a desired depth in a single pass or cut.

In another embodiment, laser energy is applied to a peripheral portion of an exterior surface of a provided generally cylindrical PCD table to remove diamond material from the peripheral portion to form a PCD table having a selected geometry. In an embodiment, the provided generally cylindrical PCD table is bonded to a similarly sized and shaped generally cylindrical substrate to define a PDC having a selected geometry. The portions of the generally cylindrical substrate that are adjacent to the peripheral portion of the PCD table (i.e., that portion that is removed) may also be removed by any suitable technique (e.g., laser cutting, grinding, lapping, electrical-discharge machining, or combinations thereof) to result in a PDC having a selected geometry, such as a non-cylindrical or a generally cylindrical geometry. For example, this method may be used to form PCD tables and PDCs having oval, square, rectangular, or other shaped profile. Of course, this method may also be used to form a PCD table or a PDC that is generally cylindrical (e.g., from a larger initial PDC from which the periphery is removed).

In another embodiment, laser energy is applied to a peripheral portion of an exterior surface of a provided PCD table to laser cut a chamfer into the PCD table. Such laser cutting of the chamfer may be achieved without the need for slow and expensive diamond grinding equipment, and provides all the benefits of chamfering such as improved wear resistance and particularly resistance to chipping and breakage.

In another embodiment, laser energy may be applied to an exterior surface of a provided PCD table to laser lap the exterior working surface to a smooth finish. For example, such a process may be employed to remove protruding portions of the exterior surface, resulting in improved smoothness. In an embodiment, the exterior surface to be laser lapped may be mapped prior to laser lapping so that it is only necessary to apply the laser energy to topographically "high" portions needing to be reduced in profile to provide a smoother exterior surface. In one embodiment, the finished surface may be flat and smooth, while other embodiments may provide a smoothly curved (e.g., concave or convex) surface.

Of course, in some embodiments, a plurality of the described laser cutting processes may be combined together in laser cutting a provided PCD table or PDC.

Laser cutting may be used to produce non-planar surfaces. For example, applications for such non-planar shapes may include, but are not limited to, jewelry and tooling, such as shaped dies, shaped punches, roof bits, bearings, and traction devices.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical or similar elements or features in different views or embodiments shown in the drawings.

FIG. 6 is a partial cross-sectional view of a PDC showing a laser cut chamfer formed therein according to an embodiment;

FIG. 6A is a partial cross-sectional close up view of a PDC showing how a laser cut chamfer may be formed according to one embodiment;

FIG. 6B is a partial cross-sectional close up view of a PDC showing how a laser cut chamfer may be formed according to an alternative embodiment;

FIG. 6C is a partial cross-sectional close up view of a PDC showing a laser cut chamfer that is disposed radially inwardly relative to the lateral surface of the PCD table;

FIGS. 8A and 8B show before and after cross-section elevation views by which an initially non-flat surface may be laser cut to result in a flat surface;

FIGS. 9A and 9B show before and after cross-section elevation views by which a flat surface may be laser cut to result in a non-flat, convex surface;

FIGS. 10A and 10B show before and after cross-section elevation views by which a flat surface may be laser cut to result in a non-flat, concave surface;

FIGS. 12A and 12B show a top plan view and an elevation view, respectively, of a laser cut surface that may include multiple recesses or pockets;

FIGS. 13A and 13B show a top plan view and an elevation view, respectively, of a laser cut surface that may include multiple protrusions;

DETAILED DESCRIPTION

I. Introduction

Embodiments of the invention relate to methods of laser cutting PCD structures, such as PCD tables and PDCs. Laser cutting of the PCD tables and PDCs provides an alternative to EDM, grinding with a diamond wheel, or lapping with a loose abrasive, such as diamond (e.g., loose dry diamond, wet diamond, or slurry diamond). Grinding or lapping with a diamond wheel is relatively slow and expensive, as diamond is used to remove a diamond material. EDM of the PCD table is sometimes impractical or even impossible, particularly when the amount of cobalt or other electrically conductive infiltrant or catalyst within the PCD table is very low (e.g., in the case of a leached PCD table). As such, laser cutting provides a valuable alternative machining method that can be employed in various processes.

As used herein, the term "laser cutting" or variants thereof encompasses laser ablation, laser scribing, and laser lapping. In addition, "laser scribing" and variants thereof is a subset of laser ablation.

As used herein, the term "laser ablation" or variants thereof refers to a process in which laser energy is applied to a given surface (e.g., of a diamond material) to evaporate or vaporize a kerf into the surface. The kerf may extend partially or fully through a thickness of the diamond material.

As used herein, the term "laser scribing" or variants thereof refers to a process in which laser energy is applied to a given surface (e.g., of a diamond material) to ablate a kerf partially through the surface, leaving a connecting portion uncut. The structure may then be broken along the laser scribed scribe line or curve.

As used herein, the term "laser lapping" or variants thereof refers to a process in which laser energy is applied to protrusions extending from a given surface (e.g., of a diamond material) to evaporate or vaporize the protruding portions, resulting in a surface with greater smoothness than prior to laser lapping.

II. Polycrystalline Diamond Tables and Compacts

Figure 1A:
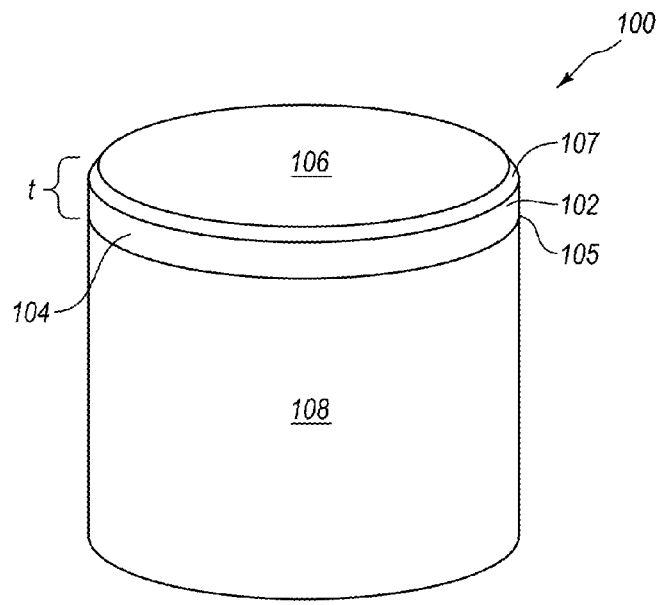
FIG. 1A is an isometric view of an embodiment of a PDC including a PCD table attached to a cemented carbide substrate.
Figure 1B:
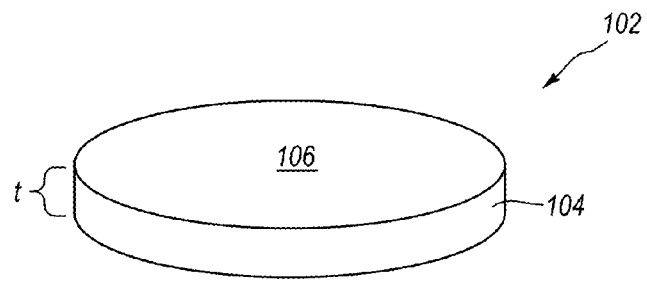
FIG. 1B is an isometric view of a PCD table similar to that shown in FIG. 1A, but not attached to a cemented carbide substrate.

FIG. 1A is an isometric view of an embodiment of a PDC 100 including a PCD table 102 attached to a cemented carbide substrate 108 along an interfacial surface 105 thereof. FIG. 1B shows a PCD table 102 that may otherwise be similar to table 102 of FIG. 1A, but which is unattached to any substrate. In either case, the PCD table 102 includes a plurality of directly bonded-together diamond grains exhibiting diamond-to-diamond bonding (e.g., $sp^3$ bonding) therebetween. The PCD table 102 includes at least one lateral surface 104, an upper exterior working surface 106, and an optional chamfer 107 extending therebetween. It is noted that at least a portion of the at least one lateral surface 104 and/or the chamfer 107 may also function as a working surface that contacts a subterranean formation during drilling operations.

The bonded together diamond grains of the PCD table 102 may exhibit an average grain size of about 100 µm or less, about 40 µm or less, such as about 30 µm or less, about 25 µm or less, or about 20 µm or less. For example, the average grain size of the diamond grains may be about 10 µm to about 18 µm, about 8 µm to about 15 µm, about 9 µm to about 12 µm, or about 15 µm to about 25 µm. In some embodiments, the average grain size of the diamond grains may be about 10 µm or less, such as about 2 µm to about 5 µm or submicron.

The diamond particle size distribution of the diamond particle may exhibit a single mode, or may be a bimodal or greater grain size distribution. In an embodiment, the diamond particles of the one or more layers of diamond particles may comprise a relatively larger size and at least one relatively smaller size. As used herein, the phrases "relatively larger" and "relatively smaller" refer to particle sizes (by any suitable method) that differ by at least a factor of two (e.g., 30 µm and 15 µm). According to various embodiments, the diamond particles may include a portion exhibiting a relatively larger average particle size (e.g., 50 µm, 40 µm, 30 µm, 20 µm, 15 µm, 12 µm, 10 µm, 8 µm) and another portion exhibiting at least one relatively smaller average particle size (e.g., 6 µm, 5 µm, 4 µm, 3 µm, 2 µm, 1 µm, 0.5 µm, less than 0.5 µm, 0.1 µm, less than 0.1 µm). In an embodiment, the diamond particles may include a portion exhibiting a relatively larger average particle size between about 10 µm and about 40 µm and another portion exhibiting a relatively smaller average particle size between about 1 µm and 4 µm. In some embodiments, the diamond particles may comprise three or more different average particle sizes (e.g., one relatively larger average particle size and two or more relatively smaller average particle sizes), without limitation.

It is noted that the as-sintered diamond grain size may differ from the average particle size of the diamond particles prior to sintering due to a variety of different reasons, such as grain growth, diamond particles fracturing, carbon provided from another carbon source (e.g., dissolved carbon in the metal-solvent catalyst), or combinations of the foregoing.

The PCD table 102 may exhibit a thickness "t" of at least about 0.040 inch, such as about 0.045 inch to about 1 inch, about 0.045 inch to about 0.500 inch, about 0.050 inch to about 0.200 inch, about 0.065 inch to about 0.100 inch, or about 0.070 inch to about 0.100 inch (e.g., about 0.09 inch). The PCD table 102 may or may not include a catalyst or infiltrant disposed in at least a portion of the interstitial regions between the bonded diamond grains of the PCD table 102. The infiltrant may include, but is not limited to, iron, nickel, cobalt, and alloys of the foregoing metals. For example, the infiltrant may be provided from the substrate 108 (e.g., cobalt from a cobalt-cemented carbide substrate). In embodiments in which a region of the PCD table 102 includes substantially no catalyst or infiltrant (e.g., less than about 2% by weight, or no more than about 1% by weight), the catalyst or infiltrant may have been removed by leaching, for example, by immersing the PCD table 102 in an acid, such as aqua regia, nitric acid, hydrofluoric acid, mixtures thereof, or other suitable acid. For example, leaching the PCD table 102 may form a leached region that extends inwardly from the exterior surface 106, the lateral surface 104, and the chamfer 107 to a selected leached depth. The selected leached depth may be about 100 µm to about 1000 µm, about 100 µm to about 300 µm, about 300 µm to about 425 µm, about 350 µm to about 400 µm, about 350 µm to about 375 µm, about 375 µm to about 400 µm, about 500 µm to about 650 µm, or about 650 µm to about 800 µm.

Valuable metals (e.g., cobalt, nickel, etc.) may be recovered following acid leaching by carbon monoxide extraction, for example, as disclosed in U.S. Pat. No. 4,322,390, herein incorporated by reference.

Figure 1C:
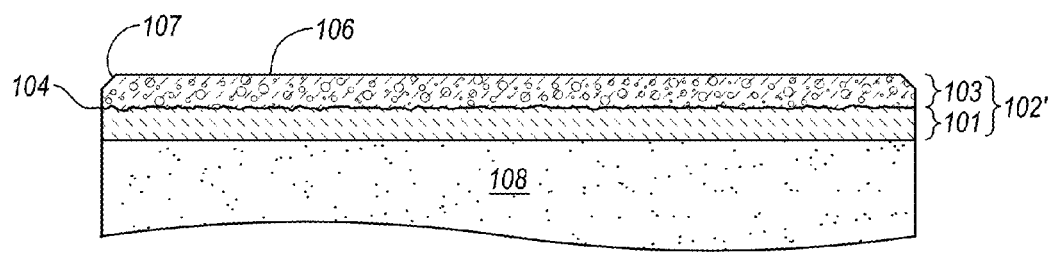
FIG. 1C is a partial cross-sectional view of a PDC including a PCD table with a leached exterior region.

FIG. 1C shows a cross-sectional view through an exemplary PCD table 102' which has been leached to include a leached region 103 adjacent to exterior surface 106 and extending inwardly therefrom to region 101, within which the concentration of catalyst or infiltrant has not been significantly reduced as a result of leaching. It will be understood that use of a laser for removal of material of the diamond table (or underlying substrate 108) may be carried out on leached or un-leached PCD diamond tables. The ability to laser cut a leached diamond table, which may include no or a very low concentration of electrically conductive catalyst or infiltrant material is particularly advantageous. For example, EDM cutting of leached diamond table structures can prove difficult and can sometimes be a practical impossibility because of insufficient electrical conductivity within the diamond table to be cut. Laser cutting offers an alternative that does not require a minimum threshold level of electrical conductivity within the part in order to allow cutting of the part.

U.S. Pat. No. 7,866,418, herein incorporated by reference, discloses PCD tables and associated PCD compacts formed under conditions in which enhanced diamond-to-diamond bonding occurs. Such enhanced diamond-to-diamond bonding is believed to occur as a result of the sintering pressure (e.g., at least about 7.5 GPa) employed during the HPHT process being further into the diamond stable region, away from the graphite-diamond equilibrium line. The PCD tables and compacts disclosed therein, as well as methods of fabrication are suitable for laser cutting according to the methods disclosed herein.

The substrate 108 may comprise a plurality of tungsten carbide or other carbide grains (e.g., tantalum carbide, vanadium carbide, niobium carbide, chromium carbide, and/or titanium carbide) cemented together with a metallic cementing constituent, such as cobalt, iron, nickel, or alloys thereof. For example, in an embodiment, the cemented carbide substrate is a cobalt-cemented tungsten carbide substrate. In some embodiments, the substrate 108 may include two or more different carbides (e.g., tungsten carbide and chromium carbide).

The PCD table 102 may be formed separately from or integral with the substrate 108 in an HPHT process. When formed separately, the PCD table 102 may be subsequently attached to the substrate 108 in another HPHT process. The temperature of such HPHT process may typically be at least about 1000° C. (e.g., about 1200° C. to about 1600° C.) and the pressure of the HPHT process may typically be at least about 4.0 GPa (e.g., about 5.0 GPa to about 12.0 GPa, about 7.0 GPa to about 9.0 GPa, about 6.0 GPa to about 8.0 GPa, or about 9.0 GPa to about 12.0 GPa).

III. Laser Cutting Methods

Figure 2A:
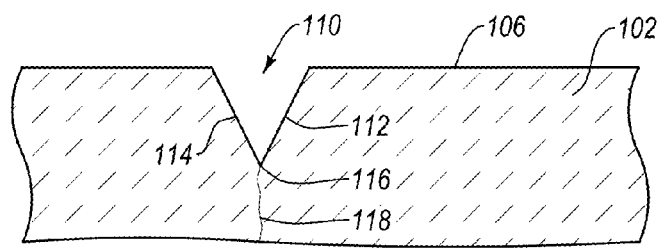
FIG. 2A is a partial cross-sectional view of a PCD table including a laser cut generally V-shaped groove cut therein.

FIG. 2A shows the PCD table 102 includes a groove 110 (e.g., generally V-shaped) that has been cut with a laser according to an embodiment. PCD table 102 may comprise a leached portion of a PCD diamond table as described in conjunction with FIG. 1C. As shown, the groove 110 may extend only partially through PCD table 102 to form a scribe line along which the PCD table 102 may be broken. In an embodiment, rather than cutting the full depth of the groove 110 in a single trajectory, the method employs multiple passes to cut progressively deeper with each pass until the laser cuts to the desired depth, or entirely through the structure. In an embodiment, the majority (e.g., substantially all) of any slag resulting from the laser cutting is also removed by the laser (e.g., by ablation) from the side walls 112 and 114 of the groove 110 as the groove 110 is progressively deepened. Slag removal is one benefit of forming groove 110 with multiple passes rather than a single cut.

As shown in FIG. 2A, the laser may be used to cut tapered sidewalls 112 and 114 so as to form a groove 110. In an embodiment, the PCD table 102 is subsequently broken along groove 110. For example, breaking of the PCD table 102 may occur along line 118 that emanates generally from lowermost region 116 (e.g., a vertex or cusp) of the groove 110. Formation of the groove 110 is advantageous as the laser-cut groove or scribe line 110 may terminate in a substantial point as viewed in transverse cross-section (or a line as viewed in plan view), providing a fracture point or line along which the PCD table 102 may be broken.

Scribing and breaking of a PCD table or PDC may be useful for fracture toughness testing and/or cross-sectional analysis. Scribing and breaking could also be used in forming a smaller PCD table or PDC (e.g., non-cylindrical in shape), although preferably excess portions would be cut or ground away (e.g., through laser cutting, EDM, or grinding) as described in greater detail below in conjunction with FIGS. 3A-5 in order to produce a smaller (and perhaps non-cylindrical in shape) PCD table or PDC.

The V-shaped groove 110 is wider at its top, adjacent exterior top surface 106, and narrows towards lower most region 116. In general terms, V-shaped grooves may include various other shapes that do not terminate in a vertex as shown. For example, the groove may alternatively be U-shaped, including a radius of curvature adjacent lower most region 116. Alternatively, the groove 110 may be flat-bottomed as shown in FIG. 2C. Such alternatives, as well as others that will be apparent to one of skill in the art, are encompassed within the term groove as used herein.

Fracture point or line 118 emanating from region 116 may be most advantageous as compared to a other groove shapes (e.g. a laser cut that does not terminate in a vertex), as it would be difficult to guide fracture of the PCD table 102 along a desired fracture line. For example, if the sidewalls 112 and 114 were not tapered so as to terminate in the vertex 116, but were substantially parallel to one another so that the "bottom" of the laser cut included a floor with some width defined between the sidewalls 112 and 114, fracture of the floor could occur at any point along the floor between sidewalls 112 and 114.

Providing a vertex so that the "bottom" of the cut terminates in a point with substantially zero width rather than a floor having some given width forces fracture to occur along the line 118. The particular angles of the sidewalls 112 and 114 may depend on the particular power and focus characteristics selected during operation of the laser. For example, higher power produces less taper, and greater focus of the laser will also produce less taper. Similarly, lower power produces greater taper, while lower or "softer" focus also produces greater taper.

In another embodiment, the method is directed to a method of progressively cutting into or through the PCD table 102 in multiple passes of the laser. Such a method of progressively deeper cutting may be performed in conjunction with cutting of a V-shaped groove as described above and shown in FIG. 2A, or alternatively such laser cutting may form another shaped laser cut (e.g., one bounded by substantially parallel sidewalls, or one bounded by outwardly tapered sidewalls rather than inwardly tapered sidewalls as shown in FIG. 2A.

Figure 2B:
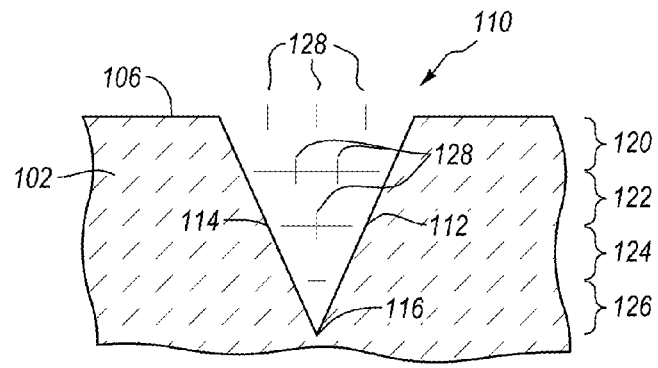
FIG. 2B is a partial cross-sectional view of a PCD table showing how the laser cut may be formed progressively wider and progressively deeper with a plurality of passes of the laser according to an embodiment.
Figure 2C:
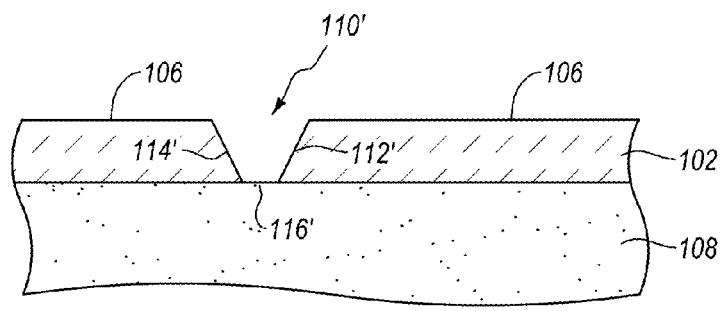
FIG. 2C is a partial cross-sectional view of a PDC in which a laser cut has been formed through the PCD table portion of the PDC, leaving the substrate of the PDC intact, according to an embodiment.

FIG. 2B schematically illustrates how a V-shaped groove similar to that shown in FIG. 2A may be formed by multiple passes of the laser to cut progressively wider and progressively deeper into the PCD table 102 according to an embodiment. The groove 110 may be formed progressively through multiple stages (e.g., a first stage 120 having a greatest width, a second stage 122 having an intermediate width, a third stage 124 having an intermediate width narrower than stage 122, and a fourth stage 126 having a narrowest width. For example, the first stage 120 may be formed by applying laser energy in one or more first stage passes to the exterior surface 106 of the PCD table 102 to ablate diamond material adjacent to the exterior surface 106 and within the first stage 120.

When forming the V-shaped groove 110, the first stage 120 will have the greatest width. The taper of the sidewalls may be achieved by selecting appropriate power and focus settings of the laser when cutting kerfs adjacent to sidewalls 112 and 114. Lower power, a less (e.g., softer) focused, more diffuse beam of laser energy, or combinations thereof may be used to increase the angle of the taper. Depending on the desired depth of the final cut groove 110, and the characteristics of the particular laser employed, more than one pass of the laser may be required to complete cutting of the first stage 120. For example, if the kerf width provided by the laser is of a width as shown by hash marks 128, four passes of the laser would be required to ablate diamond material to a depth represented by the first stage 120. Once the diamond material within the first stage 120 has been ablated, cutting may begin on the second stage 122, which requires fewer passes of the laser (e.g., 3 kerf widths wide), as the sidewalls 112, 114 are tapered. Similarly, once the diamond material from the second stage 122 has been ablated, cutting may begin on third stage 124, which requires fewer passes of the laser as compared to the previous stage (e.g., 2 kerf widths wide). The final stage may be only a single kerf width wide, and may terminate in a substantial vertex, if desired.

Employing multiple passes of the laser to form groove 110 is helpful in avoiding thermally induced damage to the PCD material of region 102, as well as when laser cutting through substrate 108. The inventor has observed that thermally induced damage may be more likely to occur when laser cutting the substrate 108 than PCD region 102. As such, the width and depth associated with cutting in substrate 108 may be smaller than when cutting within PCD material 102 so as to minimize or prevent any thermal damage to the PCD table 102 or substrate 108.

In some embodiments, the groove 110 is not to be used as a scribe line along which the PCD table 102 is broken, and the groove or cut 110 may not terminate in a substantial vertex, but may exhibit a "floor" 116' having a given width between sidewalls 112 and 114 (e.g., as seen in FIG. 2C). In one embodiment, a laser-cut groove 110 may be formed on one side of the PCD table or PDC, while an aligned cut may be formed on the opposite "bottom" side (e.g., by laser cutting or EDM) to complete the cut. Such an embodiment may be particularly helpful for laser cutting through a low conductivity (e.g., leached) diamond PCD table, while EDM may be used to cut through the opposite surface. The opposite surface may be tungsten carbide substrate and/or higher conductivity (substantially un-leached) diamond.

The angles of the sidewalls 112 and 114 are determined, at least in part, based on the power, focus, and other beam quality characteristics selected during operation of the laser. It may be advantageous to refocus the laser periodically, for example after between about 0.001 inch and about 0.15 inch (e.g., about 0.001 inch and about 0.01 inch) of diamond material has been ablated or removed from the cut. In an embodiment, refocusing may occur between about 0.003 inch to about 0.05 inch (e.g., about 0.003 inch to about 0.007 inch) of diamond material removed from the cut. In another embodiment, refocusing may occur between about 0.004 inch and about 0.006 inch (e.g., about 0.005 inch) of diamond material removed from the cut. In one embodiment, one stage may be as deep as about 0.15 inch, depending on the power of the laser and the diamond material being cut. In addition, the power and focus characteristics employed when cutting adjacent to the sidewalls 112 and 114 may differ from the power and focus settings when cutting kerfs within the central portion of the cut.

The number of stages associated with any particular cut may depend on the total depth desired. For example, where the total depth is relatively shallower, relatively fewer stages may be required, and where the total depth is deeper, more stages may be required. For example, where a total depth of cut is intended to be only about 0.003 inch (e.g., a shallow scribe line), perhaps only one stage may be required. Where a total depth of about 0.1 inch is desired, many more stages may be required, and it may be advantageous to provide a rest period between cuts so as to allow heat to better dissipate from the PCD table 102. Where rest periods are provided, the period of rest may be between about 0.2 times and about 3 times that of the active cut time, more preferably between about 0.5 times and about 2 times that of the active cut time, and even more preferably about equal to the active cut time.

Laser cuts of any desired depth may be formed according to the disclosed embodiments of methods. Often, the depth of cut desired may depend on the purpose for the cut. Where the cut is formed as a scribe line as shown in FIG. 2A along which the PCD table 102 may be broken, a depth of as little as about 0.003 inch may be sufficient, particularly where the PCD table 102 may have a total thickness between about 0.04 inch and about 0.1 inch. Where the purpose of the cut is to entirely remove a peripheral portion of the PCD table 102 of a PDC, significantly greater depth, up to the full thickness of the PCD table (e.g., about 0.1 inch) may be desired.

FIG. 2C shows the PCD table 102 attached to the substrate 108 in which a laser cut portion 110' has been formed through the PCD table 102, leaving the substrate 108 substantially intact, according to an embodiment. Of course, it may be possible to cut through the carbide substrate 108 with the laser, although alternative cutting methods for cutting the carbide substrate are also contemplated by the present disclosure. PCD products can be processed from an as-pressed condition as provided from the HPHT process to a finished diameter or dimensions much more efficiently and with substantially lower cost by first removing desired portions of the PCD table with laser ablation and/or laser scribing. These processes may be followed by final grinding, where relatively small residual portions of the diamond material may require removal, although the vast majority of diamond material to be removed is removed through laser cutting, leaving relatively little, if any, to be removed by a grinding or EDM process.

For example, the portion 110' of the PCD table 102 may be removed by laser cutting. The portion 110' is bounded by sidewalls 112' and 114' as well as a floor 116' having a width defined between sidewalls 112' and 114'. Attempting to remove the portion 110' by EDM includes attendant risks, as interaction of EDM and residual stresses within the PCD table 102 can result in cracking in the PCD table 102 and/or the substrate 108. To minimize or eliminate this problem, a laser trough/groove or portion 110' may be formed (e.g., with multiple passes of the laser to achieve both the desired width and depth) in the PCD table 102, or even the substrate 108. Gradual removal of the diamond material from the top, exterior surface 106 (or alternatively from another exterior surface such as the side or the bottom of a PCD table that is unattached to a substrate) of the PCD table 102 has been found to relieve stress in the part more uniformly. As such, laser cutting can reduce the risk of breakage as compared to EDM machining.

For example, when the PCD table 102 is cut with EDM, and the EDM wire is normal to the exterior surface 106, a stress gradient is formed at the leading edge of the cut. EDM through the PCD table 102 is believed to concentrate the stress at the leading edge of the cut, which may result in cracking of the diamond table and/or substrate.

Thus, once the portion 110' has been formed through the PCD table 102 by laser cutting, the stresses are at least partially relieved, and EDM may be more reliably used for cutting through the substrate 108.

Figure 2D:
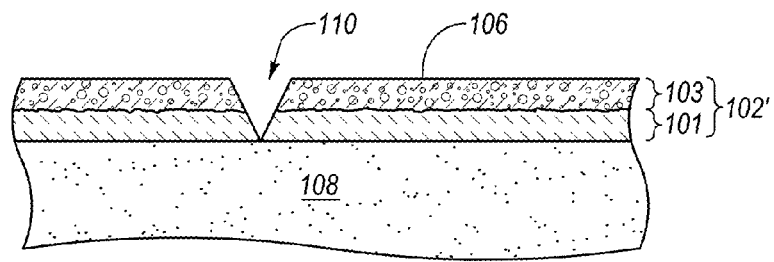
FIG. 2D is a partial cross-sectional view of a PDC including a PCD table with a leached exterior region similar to that of FIG. 1C in which a laser cut has been formed through the PCD table portion of the PDC, leaving the substrate of the PDC intact, according to an embodiment.

FIG. 2D illustrates laser cutting of a groove 110 into a PCD table 102' that specifically includes a leached region or layer 103 and an adjacent substantially un-leached region or layer 101 between leached layer and substrate 108. Groove 110 is formed through leached region 103, and may extend into substantially un-leached region 101. Although not shown, groove 110 may also extend through un-leached region 101 and into substrate 108. As a practical matter, such a groove formed into leached region 103 may be difficult or impossible to form by wire EDM, as the leached region 103 exhibits insufficient electrical conductivity to be cut by EDM. Thus, laser cutting provides a distinct advantage, as it allows cutting of such diamond table surfaces that exhibit relatively low electrical conductivity. Further cutting through substrate 108 may be achieved by EDM or laser cutting, as desired.

Laser cutting into electrically low conductivity region 103 and optionally into higher conductivity region 101 is also believed to reduce stresses within regions 103 and 101, reducing risk of cracking during any subsequent EDM operation. Such a laser cut may be shaped as shown in FIG. 2C to include a "floor" and be made wide enough to accommodate an EDM wire. The desired width and depth may be achieved through multiple passes of the laser.

Figure 3A:
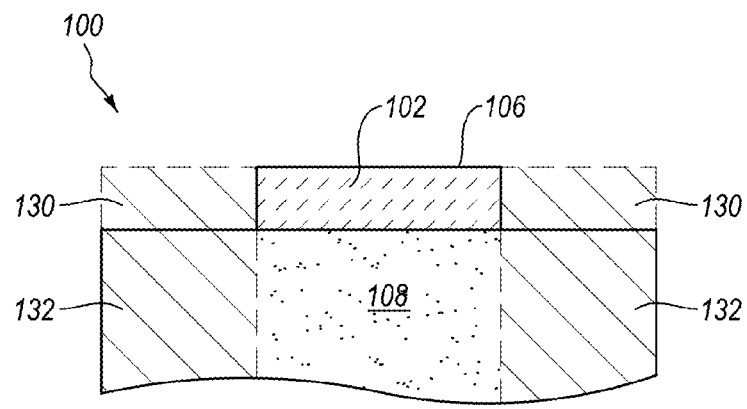
FIG. 3A is a cross-sectional schematic view of a generally cylindrical PDC in which a peripheral portion of the PCD table of the PDC is to be removed by laser cutting and adjacent portions of the substrate are also to be removed according to an embodiment.

FIG. 3A illustrates a method of laser cutting a PDC according to another embodiment. As shown in FIG. 3A, a generally cylindrical PDC 100 (e.g., such as that shown in FIG. 1A) is provided, and laser energy is applied to a peripheral portion 130 of the PCD table 102 to ablate diamond material within the peripheral portion 130. Corresponding peripheral portions 132 of the substrate 108 may also be removed (as described in greater detail below) so as to result in a PDC of a different shape than initial PDC 100. Removal of peripheral portions 132 may be through laser cutting, or by other suitable methods (e.g., EDM, CG, etc.). For example, a PDC formed according to such a method may be non-cylindrical in profile (e.g., square, rectangular, oval, etc. in profile) or generally cylindrical in profile, as desired.

Figure 3B:
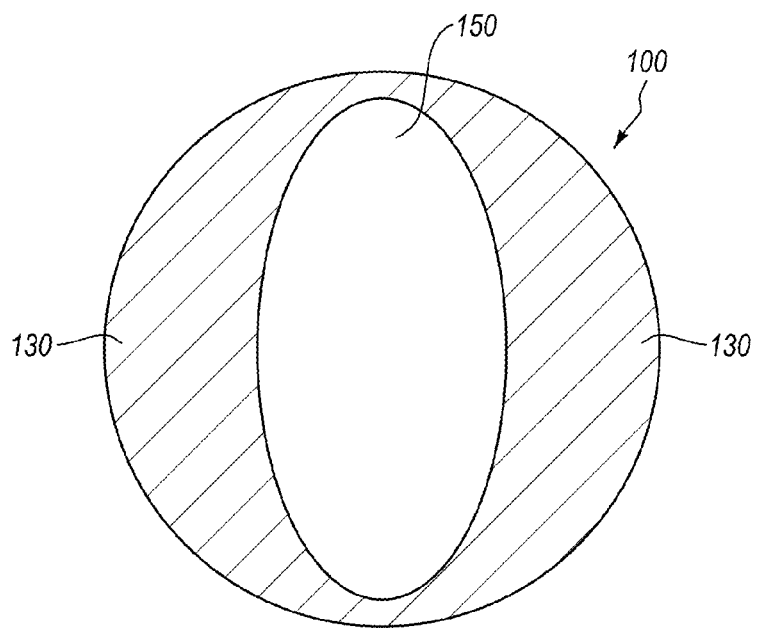
FIG. 3B is top plan view of the cylindrical PDC of FIG. 3A showing peripheral regions to be removed to form an oval PDC.
Figure 4A:
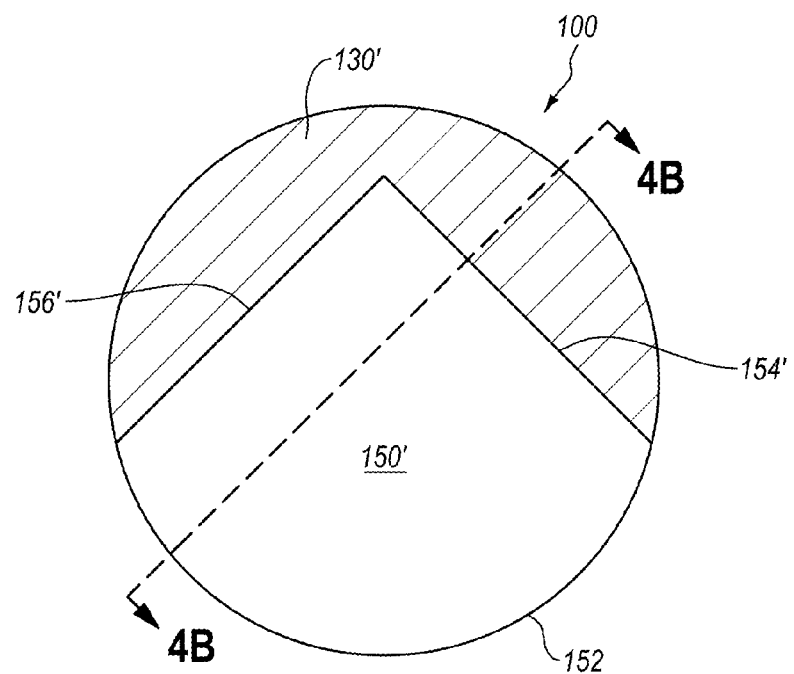
FIG. 4A is a top plan view of a generally cylindrical PDC and in which peripheral portions of the PCD table of the PDC are to be removed by laser cutting according to an embodiment.
Figure 4B:
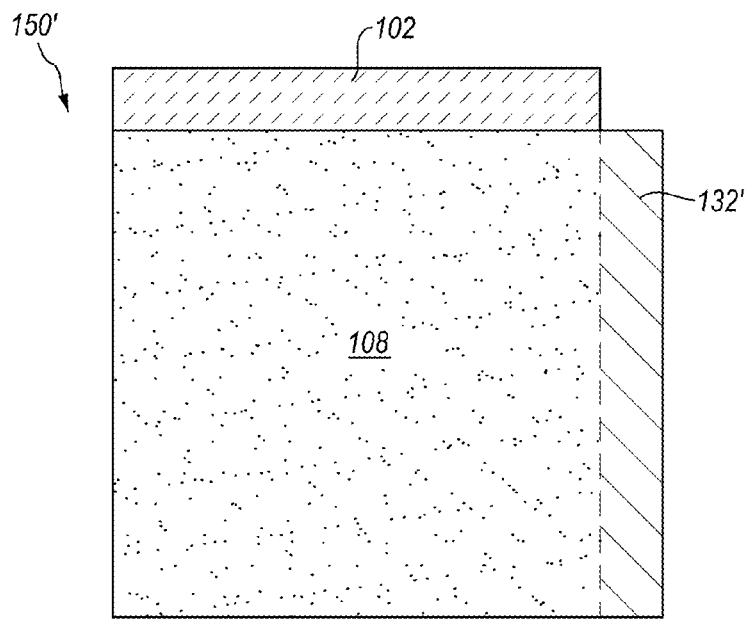
FIG. 4B is a cross-sectional view of the PDC of FIG. 4A once the selected peripheral portions of the PCD table are removed by laser cutting.

As shown in FIG. 3B, the top plan view and cross-section of the finished PDC 150 may be oval in profile and cross-section once peripheral portions 130 of PDC 100 and corresponding portions of substrate 108 are removed. Non-standard, irregular shapes may also be possible. For example, FIGS. 4A and 4B show a top plan view and a cross-sectional side view, respectively of a PDC 150' that is generally pie shaped in top view profile and cross-section according to another embodiment. PDC 150' is bounded by a curved edge 152 defined by the radius of a portion of PDC 100 and also straight edges 154' and 156'. The shape illustrated in FIG. 4A results once peripheral portion 130' of the PCD table of PDC 100 is removed by laser cutting and corresponding portions of the underlying substrate (shown in FIG. 4B as 132') are also removed. FIG. 4B shows a cross-sectional view in an intermediate state once the peripheral portion 130' has been removed, but the corresponding peripheral portion 132' of substrate 108 has not yet been removed.

Figure 5:
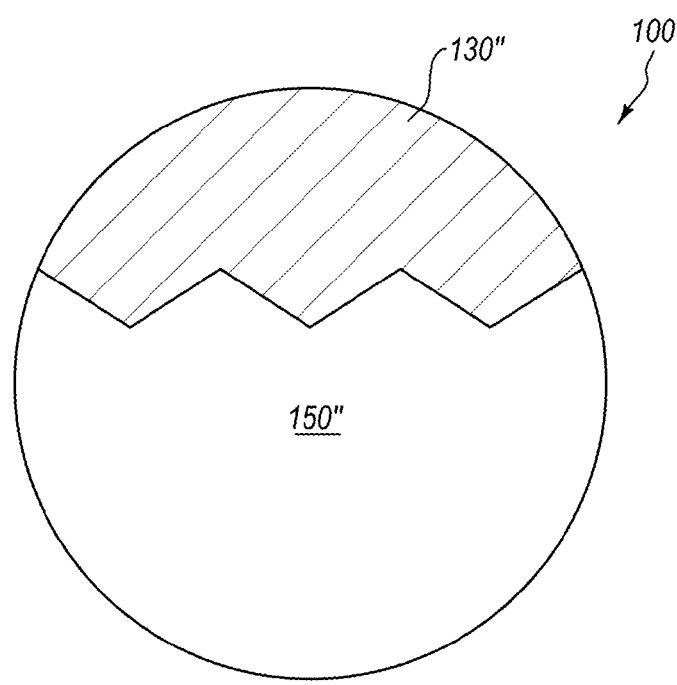
FIG. 5 is a top plan view of another generally cylindrical PDC showing another shape for a PDC formed by removing a selected peripheral portion of the cylindrical PDC according to an embodiment.

FIG. 5 shows a top plan view of another embodiment of an irregular shape PDC 150" that may be formed from a generally cylindrical PDC 100 by laser cutting away PDC table peripheral portion 130" and also removing the corresponding peripheral portion of the substrate 108 underlying peripheral portion 130" of the PCD table. Although the illustrated shapes show removal of a peripheral portion of the diamond table, it will be understood that in another embodiment, it may be possible to remove a centrally disposed portion, rather than just a peripheral portion (e.g., so as to result in a donut shaped PDC).

Removal of the underlying peripheral portion of the substrate 108 that corresponds to the laser removed portion of the PCD table 102 may be accomplished by any desired technique. For example, it may also be removed by laser cutting, or it may alternatively and/or additionally be removed by EDM, grinding, lapping, combinations thereof, or another suitable technique. Where removal may be by EDM and the removal requires the EDM wire to have a pathway from the exterior edge to an interior cutting path, the laser may be used to laser cut a pathway from the exterior edge of the part to the interior path. Although the substrate 108 may comprise a very hard material (e.g., tungsten carbide), it is significantly less hard than the PCD table 102, so that removal by mechanical techniques are much faster and less expensive than use of mechanical techniques to remove diamond material. Exemplary CNC grinding techniques are disclosed in U.S. patent application Ser. No. 12/558,939 filed Sep. 14, 2009, which is incorporated herein by reference in its entirety.

Although the above description generally describes laser cutting of "top" exterior surface 106 of PCD table 102, it will be understood that laser cutting may also be performed on peripheral surface 104 of PCD table 102 (e.g., cutting grooves into the side of table 102), or into peripheral surface or bottom substrate of 108.

FIG. 6 illustrates a PDC 100 in which laser energy has been applied to a peripheral portion of PCD table 102 extending between exterior "top" working surface 106 and lateral "side" surface 104 so as to remove a triangular region 109 seen in the cross-sectional view of FIG. 6, resulting in a laser-cut chamfer surface 107, according to an embodiment. The laser energy applied to form chamber surface 107 may be applied from a direction that is radially inward relative to peripheral edge 104, above top exterior surface 106. Alternatively, the laser energy may be applied from a direction that is radially outward relative to peripheral edge, where the laser source is positioned below surface 106. In addition, a chamfer may be formed within table 102 that is not adjacent to peripheral edge 104, but is located radially inwardly from peripheral edge 104 (e.g., similar to groove 110' of FIG. 2C).

The laser-cut chamfer 107 may prevent or minimize any tendency for the surface 106 and/or 104 to chip or break at their intersection, as a result of the shallower angle formed therebetween. Formation of the chamfer 107 by laser cutting, rather than by grinding or by EDM is advantageous, as EDM can result in stress fractures within the PCD table 102 as described above, and grinding the PCD table 102 with a diamond wheel in order to form a chamfer is slow and expensive, because diamond is being used to grind away diamond, and no harder material for the diamond wheel is known. Thus, methods of laser cutting the chamfer 107 may be less expensive, may be achieved more quickly, and may result in less waste (i.e., as product is damaged during EDM chamfering). The chamfer 107 may be smooth or have another shape formed by laser cutting, such as being serrated.

In any of the above described laser cutting techniques, the entire portion of the PCD table 102 removed to form the chamfer 107 may be ablated away by the laser. FIG. 6A illustrates such an embodiment. For example, when laser cutting a chamfer into the PCD table 102, the kerf of the one or more passes of the laser L may entirely ablate the triangular region 109. In another embodiment, a portion 109a of the PCD table may be ablated within the kerf of the laser L, while an adjacent portion 109b may simply become disconnected from the remainder of the PCD table 102. FIG. 6B shows such an alternative embodiment in which the kerf may simply cut through PCD table 102 at 109a along chamfer surface 107, leaving an un-ablated portion (triangular region 109b) that may be discarded or recycled.

In either embodiment, the chamfer may be formed on a surface of the PCD table 102 that is disposed radially inwardly relative to original lateral surface 104. For example, as shown in FIG. 6C, Groove 110 may be laser cut into PCD table 102, after which a chamfer 107 may be formed according to either of the techniques discussed above in conjunction with FIG. 6A or 6B. The peripheral portion of table 102 between original lateral surface 104 and groove 110 may be removed by any suitable method (e.g., laser cutting, EDM, grinding, breaking, etc.). In one embodiment, such a peripheral portion of table 102 may be removed by laser cutting (e.g., ablated) by rotating the PCD table or PDC while applying laser energy to the peripheral surface 104. Such a technique may employ multiple rotations of the PCD table or PDC, and the laser may be applied generally perpendicular to the rotational axis of the PCD table or PDC. The laser may also be moved longitudinally "up" and/or "down" parallel to the axis of rotation (e.g., the axis of rotation may be the longitudinal axis of the PCD table or PDC).

Figure 7A:
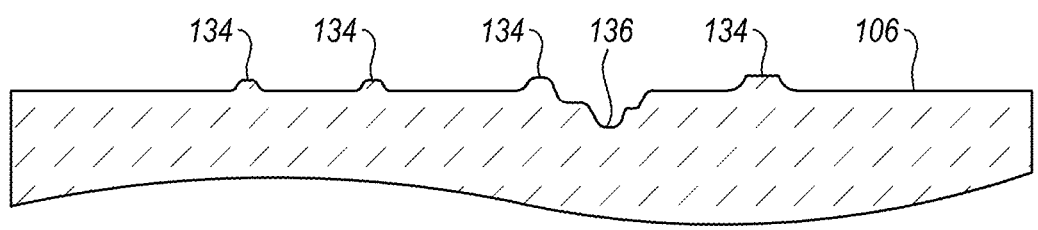
FIG. 7A is a close up cross-sectional view of an exterior surface of a PCD table including an initially rough surface with protrusions that can be smoothed by laser lapping.
Figure 7B:
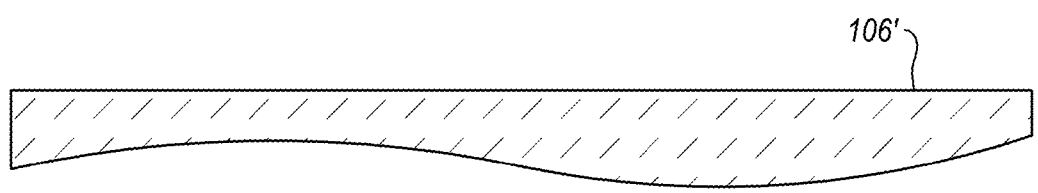
FIG. 7B is a close up cross-sectional view of the exterior surface of the PCD table of FIG. 7A after the protrusions have been removed by laser lapping according to an embodiment.

FIGS. 7A and 7B illustrate how laser cutting may be employed in lapping the exterior surface 106 of the PCD table 102 according to an embodiment. When the PCD table 102 is formed through an HPHT process, the exterior surface 106 may not be perfectly smooth, flat, or of the desired shape. For example, where a flat, smooth surface is desired the initial exterior surface 106 may include one or more protrusions 134 extending from and/or recesses 136 within the exterior surface 106. Polishing or lapping of the surface may sometimes be achieved by lapping the exterior surface 106 against another diamond exterior surface, e.g., by grinding or lapping. In addition to being relatively slow and expensive, such techniques include an attendant risk that one or more grains of diamond material may be pulled from exterior surface 106, destroying the part or at least requiring further grinding and/or polishing.

In an embodiment, laser cutting may be used to selectively remove protrusions such as protrusions 134 by applying laser energy to the protrusions 134 of the exterior surface 106 so as to remove (e.g., ablate) the diamond material of such protrusions. If any recesses (e.g., recess 136) are present, these may be removed by further lapping the entire exterior surface so as to bring it at least "down" to the bottom of the recess, as shown in FIG. 7B. This final leveling so as to remove any recesses may be accomplished by laser cutting away a depth of the entire exterior surface 106 (optionally including recess 136, e.g., up to or beyond recess 136) or by grinding or lapping against another diamond surface. Where grinding or lapping is employed, the risk of inadvertent removal of one or more grains of diamond material is reduced, as any protrusions 134 were previously removed by laser cutting. Laser removal of protrusions 134 further reduces the risk of propagation of micro-cracks within the diamond material.

In an embodiment, the laser cutting may apply laser energy across the exterior surface, so as to ablate any protrusions extending therefrom. In another embodiment, the exterior surface 106 may first be mapped (e.g., electronically, photographically, or by laser mapping) to identify the locations of the protrusions 134 (as well as any recesses 136), and then the protrusions 134 may be specifically targeted for removal by applied laser energy. In other words, the laser energy may not be applied over the entire exterior surface, but simply to those specific protruding areas 134 requiring removal. However, in some embodiments, laser cutting may be used to apply energy across the entire planarized surface 106'. For example, the substantially planarized exterior surface 106' may be formed via laser cutting to provide a desired PCD table thickness. As shown in FIG. 7B, a final substantially planarized exterior surface 106' (e.g., up to or beyond the recess 136 shown in FIG. 7A) formed as a result of the lasing process is smoother than the initial exterior surface 106.

In the embodiments discussed above for laser chamfering and laser planarizing, the PCD table may be freestanding (i.e., not attached to a substrate in substantially fully leached or un-leached form) or attached to the substrate (i.e., a PDC such as the PDC 100). For example, a freestanding PCD table may be laser chamfered, leached to at least partially remove a catalyst used in the formation thereof, and attached to a substrate 108 in a subsequent HPHT process and/or brazing process.

For some applications, the exterior surface 106 or 106' may be non-planar (e.g., jewelry or tooling such as punches, dies, roof bits, mining tools, road material removal tools, and/or traction devices). Such non-planar surfaces can be formed by the laser cutting methods disclosed herein. For example, laser cutting of the surface can even be used to form three-dimensional sculptures (e.g., of people or any object) for jewelry or other aesthetic products.

Figure 11C:
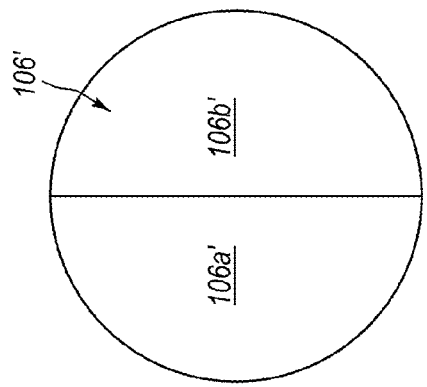
FIGS. 11A-11C show before and after cross-section elevation views and a top view (after) by which a flat surface may be laser cut to include a lower step portion and an upper step portion.
Figure 11B:
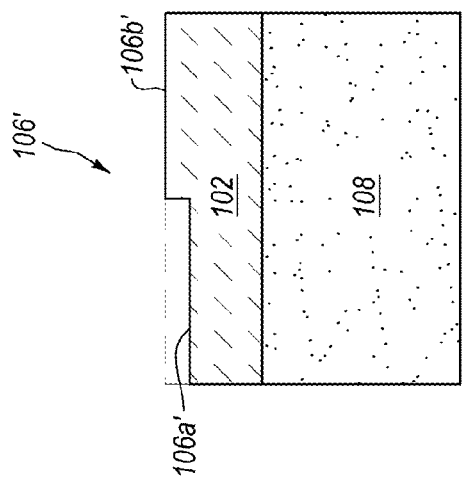
Figure 11A:
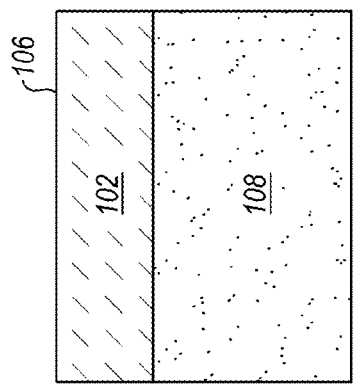

Laser cutting is not limited to removal of topographical protrusions, but may be used to achieve any of various desired shapes (e.g., non-planar shapes). For example, as shown in FIGS. 8A and 8B, an initially non-flat surface 106 may be laser cut to result in a flat surface 106', a flat surface 106 (FIG. 9A) may be laser cut to result in a non-flat, convex surface 106' (FIG. 9B), or a flat surface 106 (FIG. 10A) may be laser cut to result in a non-flat, concave surface 106' (FIG. 10B). Such concave or convex surfaces may be useful for convex or concave bearings. FIGS. 11A-11C show laser cutting of an initially flat surface 106 so as to include a lower step portion 106a' and an upper step portion 106b'. Other geometries may be formed in further embodiments. For example, the initial surface may be convex or concave and then be laser formed to a final convex or concave shape.

FIGS. 12A and 12B show a top plan view and an elevation view, respectively, of a finished surface 106' that may include multiple recesses or pockets 136. FIGS. 13A-13B show a top plan view and an elevation view, respectively of a finished surface 106' that may include multiple protrusions 134 that may be of any shape.

Figures 14A, 14B:
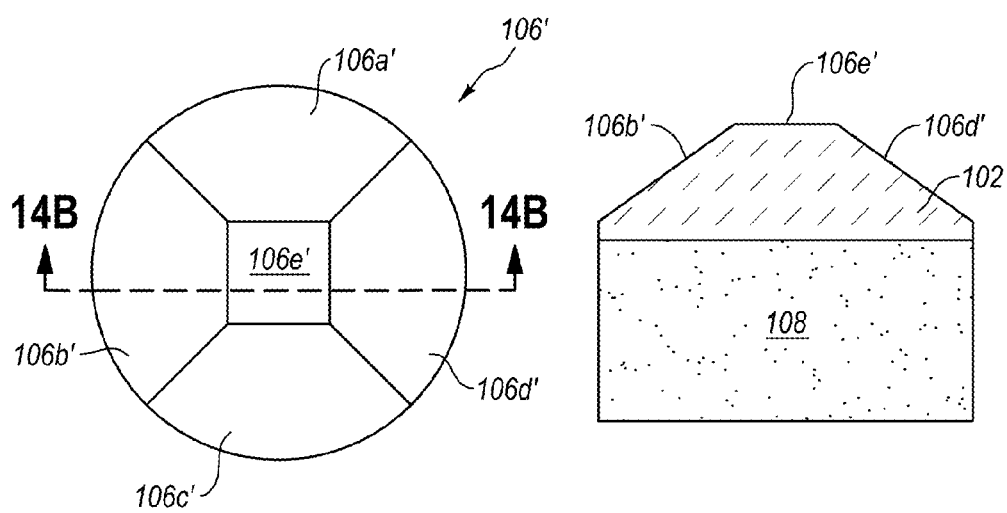
FIGS. 14A and 14B show a top plan view and a cross-sectional view, respectively, of a laser cut surface including multiple facets.

FIGS. 14A and 14B show a top plan view and a cross-sectional view, respectively, of a shaped surface 106' that may be laser cut to include multiple facets 106a'-106e'. Such shapes may be useful in PDC anvils, gem cut PCD, polycrystalline boron nitride, silicon carbide, etc. According to another embodiment, such laser cutting may be employed to laser cut a PCD table or PDC to a desired PCD table thickness (e.g., by removing some of the PCD table to achieve a desired thickness).

Figure 15A:
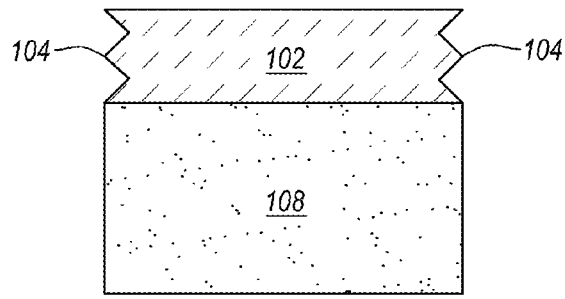
FIGS. 15A-15C show cross-sectional views of additional shaping that may be achieved along the outside diameter of the PCD table through laser cutting according to various embodiments.
Figure 15B:
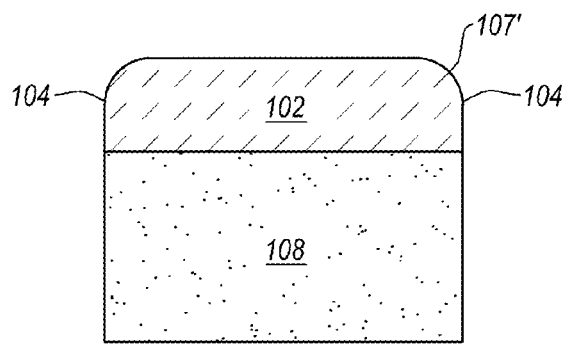
Figure 15C:
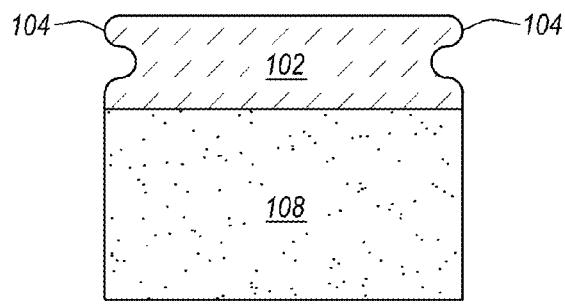

FIGS. 15A-15C show cross-sectional views of additional shaping that may be achieved along the outside diameter of the diamond table through laser cutting according to various embodiments. For example, FIG. 15A shows a cross-sectional view of a PDC including a PCD table 102 in which the peripheral edge 104 has been laser cut to include a serrated tooth pattern. FIG. 15B shows a cross-sectional view of a PDC including a PCD table 102 in which the peripheral edge 104 has been laser cut to include a radius chamfer 107'. FIG. 15C shows a cross-sectional view of a PDC including a PCD table 102 in which the peripheral edge 104 has been laser cut to include a curved, radiused recess formed into the peripheral edge 104. In some embodiments, the PCD table 102 exhibit two or more of a serrated tooth pattern (FIG. 15A), a radius chamfer (FIG. 15B), or a curved radiused recess (FIG. 15C). In light of the many disclosed examples of laser cutting to achieve a desired shape, one of skill in the art will appreciate that numerous other shapes may also be achieved.

Any suitable laser may be used for laser cutting the PCD tables and/or PDCs. For example, solid state lasers, gas lasers, or chemical lasers may be employed. One particularly suitable laser is a ytterbium fiber laser. Other suitable lasers may include Nd:YAG lasers, $CO_2$ lasers, and copper vapor lasers. In an embodiment, the power of the laser may be between about 1 watt and about 1000 watts, about 1 watt to about 500 watts, or about 1 watt to about 100 watts. In another embodiment, laser power may be between about 5 watts and about 50 watts. In another embodiment, laser power may be between about 10 watts and about 30 watts (e.g., about 20 watts).

IV. Rotary Drill Bits and Other Structures Including PDCs

The PDCs formed according to the various embodiments disclosed herein may be used as PDC cutting elements on a rotary drill bit. For example, in a method according to an embodiment of the invention, one or more PDCs may be received that were fabricated according to any of the disclosed manufacturing methods and attached to a bit body of a rotary drill bit.

Figure 16:
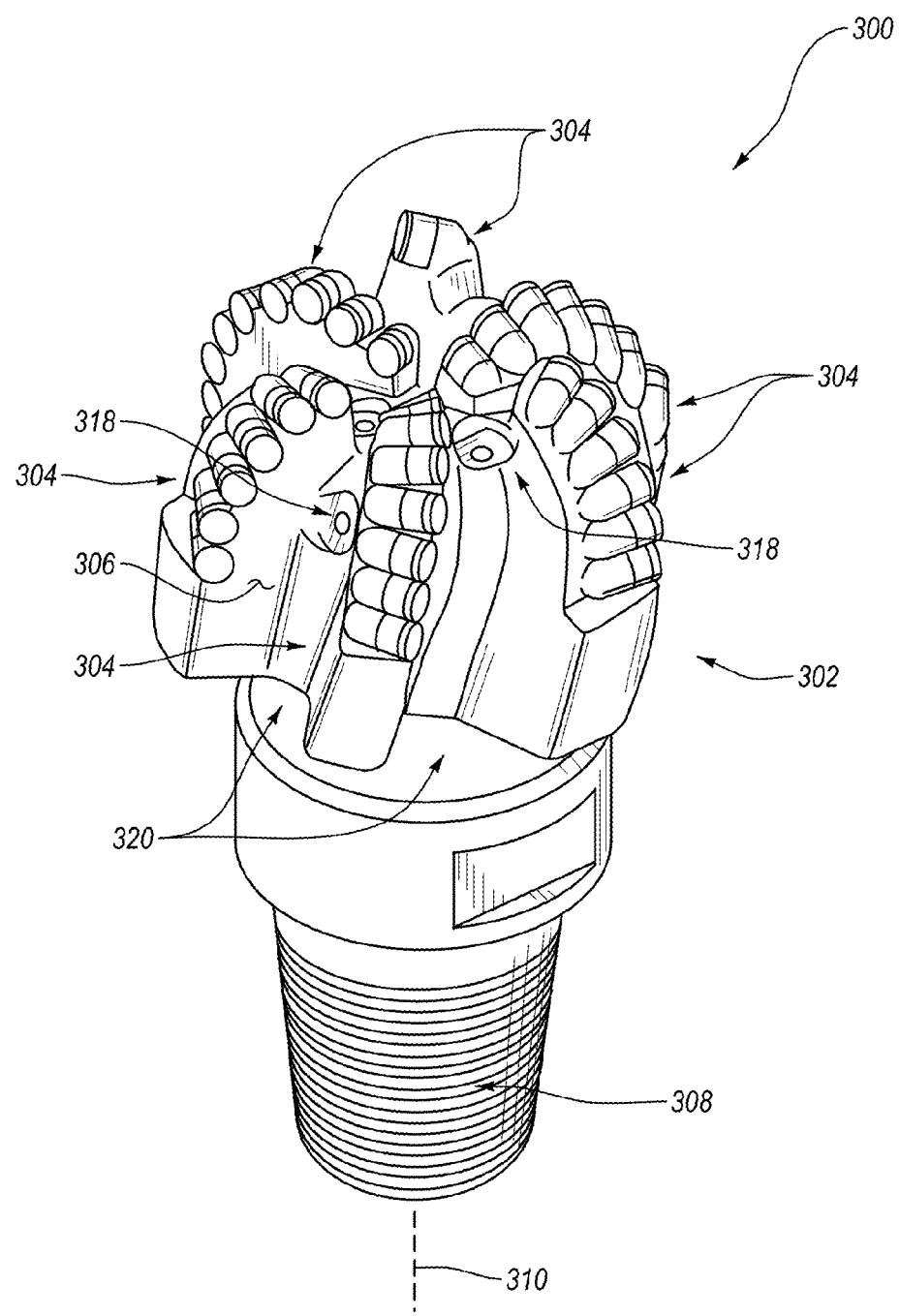
FIG. 16 is an isometric view of an embodiment of a rotary drill bit that may employ one or more of PDCs manufactured according to the any of the disclosed embodiments.
Figure 17:
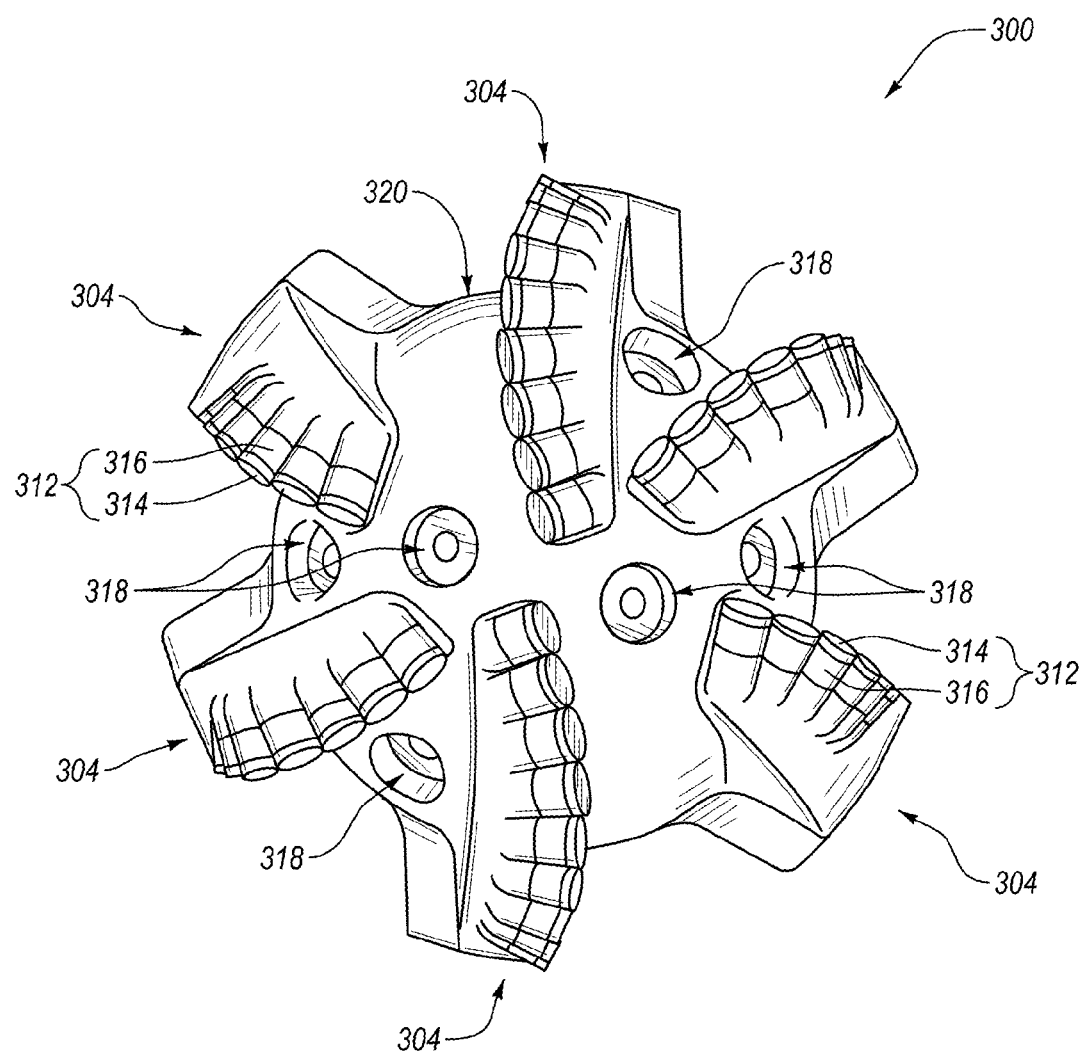
FIG. 17 is a top elevation view of the rotary drill bit shown in FIG. 16.

FIG. 16 is an isometric view and FIG. 17 is a top elevation view of an embodiment of a rotary drill bit 300 that includes at least one PDC configured and/or fabricated according to any of the disclosed PDC embodiments. The rotary drill bit 300 comprises a bit body 302 that includes radially and longitudinally extending blades 304 having leading faces 306, and a threaded pin connection 308 for connecting the bit body 302 to a drilling string. The bit body 302 defines a leading end structure for drilling into a subterranean formation by rotation about a longitudinal axis 310 and application of weight-on-bit. At least one PDC, configured according to any of the previously described PDC embodiments, may be affixed to the bit body 302. With reference to FIG. 17, each of a plurality of PDCs 312 is secured to the blades 304 of the bit body 302 (FIG. 16). For example, each PDC 312 may include a PCD table 314 bonded to a substrate 316. More generally, the PDCs 312 may comprise any PDC disclosed herein, without limitation.

In addition, if desired, in some embodiments, a number of the PDCs 312 may be conventional in construction. Also, circumferentially adjacent blades 304 define so-called junk slots 320 therebetween. Additionally, the rotary drill bit 300 includes a plurality of nozzle cavities 318 for communicating drilling fluid from the interior of the rotary drill bit 300 to the PDCs 312.

FIGS. 16 and 17 merely depict one embodiment of a rotary drill bit that employs at least one PDC fabricated and structured in accordance with the disclosed embodiments, without limitation. The rotary drill bit 300 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIG. 1A) may also be utilized in applications other than cutting technology. For example, the disclosed PDC embodiments may be used in wire dies, bearings, artificial joints, inserts, cutting elements, heat sinks, jewelry, and tooling such as shaped dies and shaped punches. PDCs including non-planar surfaces (e.g., exterior surface 106) may be particularly useful in applications such as jewelry and tooling. Thus, any of the PDCs disclosed herein may be employed in an article of manufacture including at least one PCD table or compact.

Thus, the embodiments of PDCs disclosed herein may be used in any apparatus or structure in which at least one conventional PDC is typically used. In an embodiment, a rotor and a stator, assembled to form a thrust-bearing apparatus, may each include one or more PDCs (e.g., PDC 100 of FIG. 1A) configured according to any of the embodiments disclosed herein and may be operably assembled to a downhole drilling assembly. U.S. Pat. Nos. 4,410,054; 4,560,014; 5,364,192; 5,368,398; 5,480,233; 7,552,782; and 7,559,695, the disclosure of each of which is incorporated herein, in its entirety, by this reference, disclose subterranean drilling systems within which bearing apparatuses utilizing superabrasive compacts disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,268,276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A method of shaping a polycrystalline diamond table ("PCD"), comprising:
    providing the PCD table, wherein the PCD table defines an exterior surface and includes a plurality of bonded diamond grains defining interstitial regions in which at least a portion thereof includes metal-solvent catalyst therein, the PCD table defining;
    applying laser energy to at least the exterior surface of the PCD table to remove diamond material adjacent to the exterior surface so as to form a groove that extends inwardly from the exterior surface; and
    breaking the PCD table along the groove.

2. The method of claim 1 wherein applying laser energy to at least the exterior surface of the PCD table to remove diamond material adjacent to the exterior surface so as to form a generally V-shaped groove that extends inwardly from the exterior surface comprises applying laser energy in multiple passes, wherein the depth of material removed during each of the multiple passes of the laser is sufficiently low so as to prevent substantial thermal damage to the PCD table.

3. The method of claim 2 wherein each of the multiple passes of the laser removes the diamond material to a depth between about 0.001 inch and about 0.15 inch.

4. The method of claim 2 wherein each of the multiple passes of the laser removes the diamond material to a depth between about 0.003 inch and about 0.05 inch.

5. A method of shaping a polycrystalline diamond ("PCD") table, comprising:
    providing the PCD table, wherein the PCD table includes a plurality of bonded diamond grains and defines an exterior surface having an upper surface and a lateral surface;
    applying laser energy in a first pass to the upper surface of the PCD table to remove diamond material to a first depth from the upper surface of the PCD table to form a portion of at least one annular groove in the upper surface of the PCD table inwardly offset from the lateral surface;

applying laser energy in at least one subsequent pass to remove exposed diamond material adjacent to and at a successive depth greater than the diamond material removed in an immediately previous pass to form another portion of the at least one annular groove in the upper surface of the PCD table;

wherein the at least one annular groove is partially defined by at least one tapered sidewall and exposes the substrate; and wherein the amount of diamond material removed during each of the subsequent passes of the laser is sufficiently low so as to substantially prevent thermal damage to the PCD table.

6. The method of claim 5 wherein each of the subsequent passes of the laser removes a successive depth between about 0.001 inch and about 0.15 inch of diamond material as a cut is progressively formed.

7. The method of claim 5 wherein each of the subsequent passes of the laser removes a successive depth between about 0.003 inch and about 0.5 inch of diamond material as a cut is progressively formed.

8. A method of forming a polycrystalline diamond compact ("PCD") having a selected geometry ("PDC"), comprising:

providing a generally cylindrical PDC including a generally cylindrical polycrystalline diamond ("PCD") table including a plurality of bonded diamond grains defining an exterior surface including an upper surface and a lateral surface, the generally cylindrical PDC further comprising a generally cylindrical substrate to which the generally cylindrical PCD table is attached;

applying laser energy to a portion of the upper surface of the generally cylindrical PCD table to remove diamond material from the generally cylindrical PCD table to form at least one annular groove offset inwardly from the lateral surface; and removing portions of the generally cylindrical substrate underlying the at least one annular groove of the generally cylindrical PCD table to form the PDC having the selected geometry by grinding, lapping, electrical-discharge machining, or combinations thereof.

9. The method of claim 8 wherein the PDC having the selected geometry exhibits a generally cylindrical.

10. The method of claim 8 wherein the portion is removed to a first depth as a result of a first pass of the laser, and a remainder of the portion adjacent to and deeper than the portion removed in the first pass is removed as a result of at least one subsequent pass of the laser so that the portion is progressively removed through multiple subsequent passes of the laser, and wherein a depth of material removed during each pass of the laser is sufficiently low so as to prevent substantial thermal damage to the PCD table.

11. The method of claim 10 wherein each of the subsequent passes of the laser removes a depth of between about 0.001 inch and about 0.15 inch of diamond material as the portion is progressively ablated.

12. The method of claim 10 wherein each of the subsequent passes of the laser removes a depth of between about 0.003 inch and about 0.5 inch of diamond material as the portion is progressively ablated.

13. The method of claim 1 wherein the PCD table is at least partially leached of the metal-solvent catalyst.

14. The method of claim 1 wherein the PCD table is not leached of the metal-solvent catalyst.

15. The method of claim 1 wherein the metal-solvent catalyst includes iron, nickel, cobalt, or alloys thereof.

16. The method of claim 5 wherein the at least one groove terminates at a vertex.

17. The method of claim 5 wherein the PCD table is at least partially leached.

18. The method of claim 5 wherein the PCD table is unleached.

19. The method of claim 8 wherein removing portions of the generally cylindrical substrate that are at least proximate to the at least one groove of the generally cylindrical PCD table to form the PDC having the selected geometry includes removing the portions of the generally cylindrical substrate by grinding.

20. The method of claim 19 wherein the grinding includes centerless grinding.

21. The method of claim 8 wherein the at least one groove terminates at a vertex.

22. The method of claim 8 wherein the at least one groove terminates at the generally cylindrical substrate.

23. The method of claim 8 wherein the generally cylindrical PCD table is at least partially leached.

24. The method of claim 8 wherein the generally cylindrical PCD table is unleached.

25. The method of claim 5 wherein applying laser energy in at least one subsequent pass includes forming the annular groove wide enough to accommodate an EDM wire.

26. The method of claim 8 wherein the applying laser energy to a portion of the working surface of the generally cylindrical PCD table to remove diamond material from the generally cylindrical PCD table to form at least one annular groove includes forming the at least one annular groove wide enough to accommodate an EDM wire.

* * * * *

UNITED STATES PATENT AND TRADEMARK OFFICE
CERTIFICATE OF CORRECTION

PATENT NO.         : 9,062,505 B2                                  Page 1 of 1
APPLICATION NO.    : 13/166007
DATED              : June 23, 2015
INVENTOR(S)        : Chapman et al.

It is certified that error appears in the above-identified patent and that said Letters Patent is hereby corrected as shown below:

On the title page

Item [52] under "U.S. Cl.", insert -- USPC ……… 175/426, 434 --, after CPC Class.

Page 2, Column 2, Item [56] under "OTHER PUBLICATIONS", Line 1, delete "oF" and insert -- of --, therefor.

In the claims

Column 16, Claim 1, Line 38-39, delete "therein; the PCD table defining;" and insert -- therein; --, therefor.

Column 17, Claim 8, Line 26, delete "("PCD")" and insert -- ("PDC") --, therefor.

Column 17, Claim 8, Line 26, delete "geometry ("PDC")," and insert -- geometry, --, therefor.

Signed and Sealed this
Twenty-fourth Day of May, 2016

Michelle K. Lee
*Director of the United States Patent and Trademark Office*